(12) United States Patent
Tyler

(10) Patent No.: US 7,488,244 B2
(45) Date of Patent: Feb. 10, 2009

(54) APPARATUS FOR SKINNING SQUIRRELS

(76) Inventor: Donald Tyler, 5286 Will Jackson Rd., Cadiz, KY (US) 42211

( * ) Notice: Subject to any disclaimer, the term of this patent is extended or adjusted under 35 U.S.C. 154(b) by 0 days.

(21) Appl. No.: 12/080,549

(22) Filed: Apr. 4, 2008

(65) Prior Publication Data

US 2008/0261501 A1 Oct. 23, 2008

Related U.S. Application Data

(60) Provisional application No. 60/925,584, filed on Apr. 20, 2007.

(51) Int. Cl.
*A22C 17/00* (2006.01)

(52) U.S. Cl. ...................................... 452/132

(58) Field of Classification Search ............... 452/125, 452/128–132, 102–105, 12, 13, 15–17; 30/120.1–120.5; 99/572, 579, 580, 582
See application file for complete search history.

(56) References Cited

U.S. PATENT DOCUMENTS

| | | | |
|---|---|---|---|
| 2,052,231 A | * | 8/1936 | Kanzler ...................... 452/16 |
| 3,137,030 A | | 6/1964 | Varner |
| 3,568,243 A | | 3/1971 | Hires |
| 3,570,049 A | | 3/1971 | Muckelrath |
| 3,945,083 A | | 3/1976 | Heightshoe |
| 4,094,041 A | | 6/1978 | Steed |
| 4,506,411 A | | 3/1985 | Ivy |
| 4,543,688 A | * | 10/1985 | Barchus ...................... 452/187 |
| 4,590,644 A | * | 5/1986 | Maniscalco .................. 452/16 |
| 4,625,363 A | | 12/1986 | Watson |
| 4,905,350 A | * | 3/1990 | Gardner ...................... 452/16 |
| 6,035,772 A | * | 3/2000 | Thompson .................... 99/571 |
| 6,042,469 A | * | 3/2000 | Wagner ....................... 452/185 |
| 7,163,452 B1 | | 1/2007 | Taylor |

\* cited by examiner

*Primary Examiner*—Thomas Price
(74) *Attorney, Agent, or Firm*—Christina Ezell

(57) ABSTRACT

An apparatus for skinning a squirrel that is easily manufactured, portable, quick and in which the apparatus can be mounted to a variety of surfaces. The apparatus comprises a base plate connected to toggle clamp in which the toggle clamp is engaged to press two metal tubes tightly together. The base plate is bent at an angle and secured to a stationary object. The tail of the squirrel is placed in the apparatus in between the two metal tubes and the toggle clamp is engaged to secure the tail. The skin is pulled from the uncut skin of the tail thereby removing the skin from the body in two pieces of skin.

8 Claims, 1 Drawing Sheet

APPARATUS FOR SKINNING SQUIRRELS

This application claims the benefit of provisional patent application Ser. No. 60/925,584, filed Apr. 20, 2007 by the present inventor.

BACKGROUND OF THE INVENTION

The present invention relates to animal butchering and, more specifically to squirrel skinning and cleaning. The present invention is an apparatus for holding a squirrel while it is being skinned.

Devices for this purpose in the prior art generally involve impaling the squirrel to hold it for skinning or cleaning, which is potentially hazardous. Examples are U.S. Pat. Nos. 3,137,030 to Varner and 4,094,041 to Steed. Other devices use two or more parts for gripping the animal such as in U.S. Pat. Nos. 3,568,243 to Hines; 3,570,049 to Muckelrath; 3,945,083 to Heightshoe; 4,506,411 to Ivy; and 4,543,688 to Barchus. These devices are relatively large and bulky and are not easily transported with the hunter and multi-part devices are expensive to manufacture. Other devices, such as in U.S. Pat. Nos. 4,625,363 to Watson and 7,163,452 to Taylor, hold the squirrel by the chest, legs, or neck.

It is well known that when a squirrel is manually skinned without the aid of a device, one must first start by pulling the hair away from a spot just above where the tail joins the body and make a cut that leaves a strip of skin uncut at the top edge of the tail. The tail must remain firmly attached to the body and is used as leverage to complete the skinning of the squirrel. Generally, the foot is placed on the tail and held against the ground throughout the skinning process. The present invention holds the squirrel firmly in place by the tail, the grip traditionally used in manually skinning a squirrel, instead of by the chest, legs, or head used in the prior art inventions. The strip of cut skin of the squirrel is pulled in an upward motion, thereby removing the skin from the body. One advantage of the present invention is that it eliminates the need to step on the tail and bend over to complete the skinning process. Further, the present invention is easily manufactured, portable, and can be mounted on a variety of objects.

DETAILED DESCRIPTION OF THE INVENTION

Figure 1:
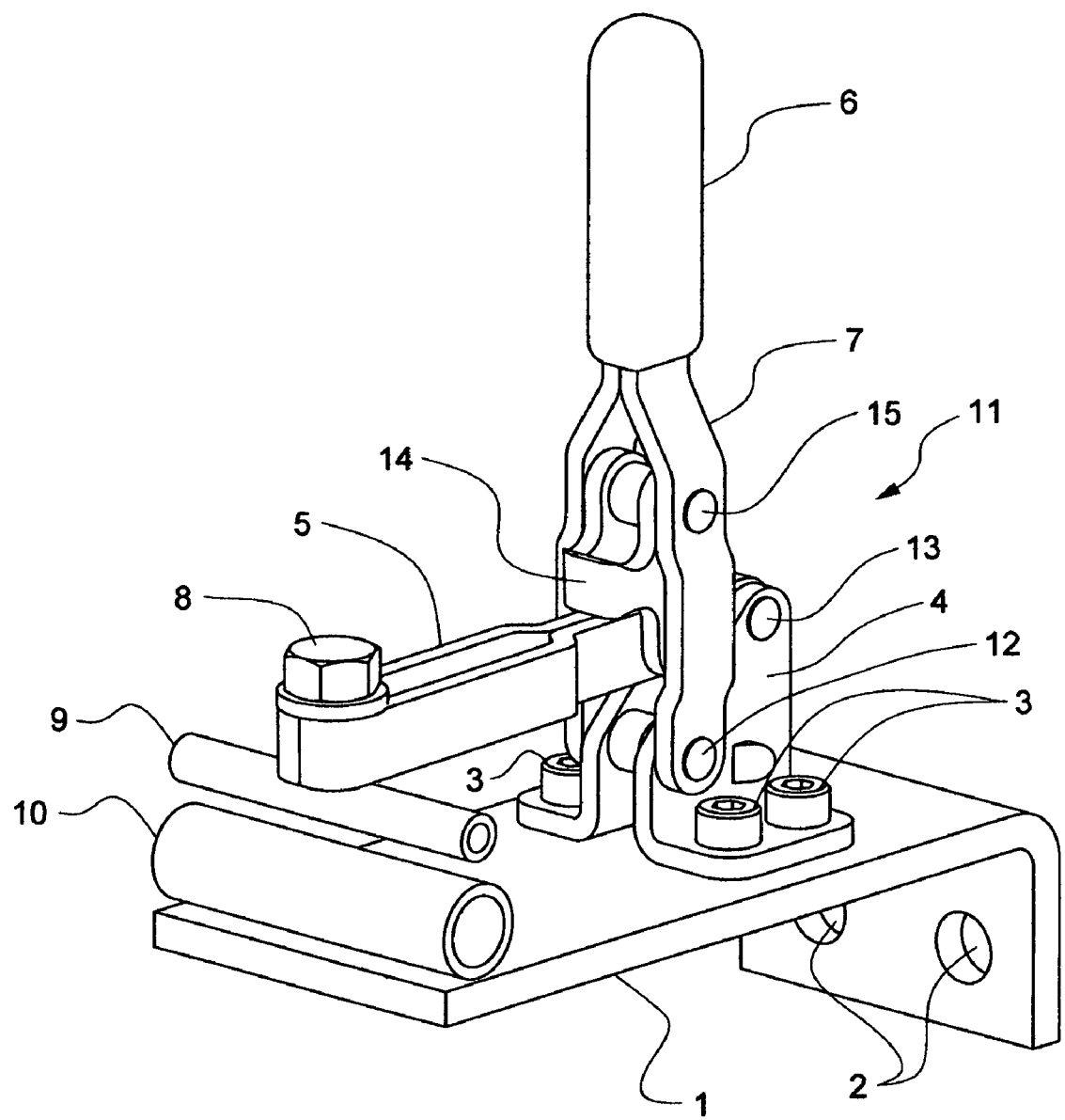
FIG. 1 is a perspective view of the squirrel skinning apparatus in accordance with the invention.

FIG. 1 of the apparatus illustrates a preferred embodiment of the present invention and is designated generally as 11. Base plate 1 is a solid metal form bent at a 90 degree angle on one end which allows for the base plate 1 to be mounted using screw holes 2 perpendicular to a stationary object such as a pole, tree, or trailer hitch. A toggle clamp comprising base 4, which is attached to pivoting arm 7 at screw 12; stationary arm 5, which is attached to base 4 at screw 13; metal plate 14, which is attached to pivoting arm 7 at screw 15; and handle 6 which is molded to pivoting arm 7. Base 4 is attached to base plate 1 using bolts 3. An additional bolt 3 is not visible in FIG. 1, however base 4 is attached using four bolts. A metal tube 9 is connected to stationary arm 5 using bolt 8. A metal tube 10 is welded to base plate 1. The squirrel skinning apparatus 11 is secured to a stationary object using screw holes 2 and the toggle clamp is engaged by moving pivoting arm 7 perpendicular to base plate 1 using handle 6. Metal plate 14 presses against stationary arm 5 moving stationary arm 5 in a downward motion parallel to base plate 1 and locks the toggle clamp. When the toggle clamp is locked, metal tube 9 and metal tube 10 are pressed tightly together. The apparatus aids in the skinning of the squirrel. First, the squirrel's hair is pulled away from a spot just above where the tail joins the body and a cut that leaves a strip of skin uncut at the top edge of the tail is made. The squirrel's tail is placed in between metal tube 9 and metal tube 10 and the clamp is locked as described above. The skin of the squirrel is peeled back and gripped in the area where it has been previously cut and is then pulled down to complete the skinning operation. The skin and tail remain in between the metal tubes and the rest of the squirrel is completely removed from the skin in two pieces.

Although the preferred embodiment is specifically illustrated and described herein, it will be appreciated that many modifications and variations of the present invention are possible in light of the above teachings without departing from the spirit and intended scope of the invention.

What is claimed is:

1. An apparatus that aids in the skinning and cleaning of a squirrel comprising:
   (A) a base plate comprising a solid metal form with a bend at an angle to form a bent end and a non-bent end;
   (B) a toggle clamp comprising a base, a stationary arm, a pivoting arm, a metal plate and a handle wherein said stationary arm and pivoting arm are connected to said base using screws so as to form a 90 degree angle; and wherein said pivoting arm is connected to said metal plate using screws on one end and said handle is molded to said pivoting arm on the other end;
   (C) a first metal tube;
   (D) a second metal tube;
   (E) a first fastening device;
   (F) a second fastening device;
   wherein said base plate is connected at said bent end to a stationary object using said first fastening device; and
   wherein said toggle clamp is connected to said base using said second fastening device; and
   wherein said first metal tube is connected to the end of said pivoting arm that is not already connected to said base of said toggle clamp using a bolt and said second metal tube is welded to said base plate at said non-bent end in order to form a gap between said first metal tube and said second metal tube; and
   wherein said toggle clamp is engaged by moving said handle in a downward motion until said handle is parallel to said base plate thereby pressing said metal plate against said stationary arm to move said stationary arm towards said base plate; and
   wherein upon engaging said toggle clamp the said first metal tube and said second metal tube are pressed tightly together.

2. The apparatus of claim 1 wherein said angle of said base plate is between 80 and 110 degrees.

3. The apparatus of claim 2 wherein said angle is formed at distance between 1/16 and 1/2 the length of said solid metal form.

4. The apparatus of claim 1 wherein said toggle clamp is connected to said base plate between 1/16 and 1/2 the distance to said bent end of said base plate.

5. The apparatus of claim 1 wherein said first metal tube is between 1/16 and 1/2 inch in diameter.

6. The apparatus of claim 1 wherein said second metal tube is between 1/16 and 1/2 inch in diameter.

7. The apparatus of claim 1 wherein said first fastening device is selected from the group comprising screws, bolts, or nails.

8. The apparatus of claim 1 wherein said second fastening device is selected from the group comprising screws, bolts, or nails.

* * * * *